(12) United States Patent
Mueller et al.

(10) Patent No.: US 10,729,132 B2
(45) Date of Patent: *Aug. 4, 2020

(54) XYLOPHAGE CONTROL USING ANTIMETHANOGENIC REAGENTS

(71) Applicant: Environmental Intellectual Property, Inc, Pipersville, PA (US)

(72) Inventors: James Mueller, Freeport, IL (US); Michael Scalzi, Doylestown, PA (US); Antonis Karachalios, Hatfield, PA (US)

(73) Assignee: Environmetal Intellectual Property, Inc., Pipersville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/826,507

(22) Filed: Nov. 29, 2017

(65) Prior Publication Data

US 2018/0213777 A1 Aug. 2, 2018

Related U.S. Application Data

(63) Continuation-in-part of application No. 15/269,903, filed on Sep. 19, 2016, now Pat. No. 10,219,518.

(60) Provisional application No. 62/220,389, filed on Sep. 18, 2015, provisional application No. 62/497,710, filed on Nov. 29, 2016.

(51) Int. Cl.
*A61K 36/8962* (2006.01)
*A01N 41/12* (2006.01)
*A01N 65/00* (2009.01)
*A01N 61/00* (2006.01)
*A01N 37/06* (2006.01)

(52) U.S. Cl.
CPC ............. *A01N 41/12* (2013.01); *A01N 37/06* (2013.01); *A01N 61/00* (2013.01); *A01N 65/00* (2013.01)

(58) Field of Classification Search
None
See application file for complete search history.

(56) References Cited

U.S. PATENT DOCUMENTS

| | | | |
|---|---|---|---|
| 5,592,774 A | 1/1997 | Galyon | |
| 5,648,258 A | 7/1997 | Odom | |
| 5,661,164 A | 8/1997 | Otsu | |
| 5,985,907 A | 11/1999 | Wolin | |
| 6,374,536 B1 | 4/2002 | Washburn | |
| 6,584,728 B2 | 7/2003 | Aesch | |
| 6,681,518 B2 | 1/2004 | Aesch | |
| 8,586,025 B2 | 11/2013 | Hatano | |
| 10,219,518 B2 * | 3/2019 | Scalzi | A01N 25/006 |
| 2003/0167678 A1 | 9/2003 | Hunt | |
| 2003/0219467 A1 | 11/2003 | Miner | |
| 2009/0010979 A1 | 1/2009 | Baker | |
| 2012/0315339 A1 * | 12/2012 | Duval | A61K 31/21 424/600 |
| 2013/0217574 A1 * | 8/2013 | Reid | A01N 43/40 504/118 |
| 2014/0322798 A1 * | 10/2014 | Scalzi | B09C 1/10 435/252.1 |
| 2017/0196240 A1 * | 7/2017 | Park | A23K 20/121 |

FOREIGN PATENT DOCUMENTS

| | | |
|---|---|---|
| CN | 1053558 C | 6/2000 |
| CN | 103829090 A | 6/2014 |

OTHER PUBLICATIONS

Soliva C. et al. Ruminal Methane Inhibition Potential of Various Pure Compounds in Comparison with Garlic Oil as Determined with a Rumen Simulation Technique. British J of Nutrition 106:114-122, 2011. (Year: 2011).*

Gottlieb, K., et al., "Inhibition of Methanogenic Archaea by Statins as a Targeted Management Strategy for Constipation and Related Disorders," AP&T 2016; 43: 197-212, John Wiley & Sons Ltd.

Reay, Dave, "Methane Sources—Termites," GreenHouse Gas Online, 2006, available at http://www.ghgonline.org/methanetermite.htm.

Hook, Sarah E., et al., "Methanogens: Methane Producers of the Rumen and Mitigation Strategies," Hindawi Pub. Co., Archaea, vol. 2010, Article ID 945785.

Johnson, Jane M. F., et al., "Agricultural Opportunities to Mitigate Greenhouse Gas Emissions," Elsevier Ltd., Environmental Pollution 150 (2007) 107-124.

Moss, Angela R., et al., "Methane Production by Ruminants: Its Contribution to Global Warming," INRA, EDP Sciences, Ann. Zootech. 49 (2000) 231-253.

Pester, Michael, et al., "Methane Oxidation in Termite Hindguts: Absence of Evidence and Evidence of Absence," Applied and Environmental Microbiology, vol. 3, No. 6, Mar. 2007, p. 2024-2028.

Velu, Gomati, "Green House Gas Emissions from Termite Ecosystem," Academic Journals, African Journal of Environmental Science and Technology vol. 5(2), pp. 56-64, Feb. 2011.

(Continued)

*Primary Examiner* — Ralph J Gitomer

(74) *Attorney, Agent, or Firm* — Douglas J. Ryder; Ryder, Mazzeo & Konieczny LLC

(57) ABSTRACT

A method for controlling xylophages (e.g., termites, Asian Beetle, Emerald Ash borer, Weevils, Deathwatch Caterpillars, cockroaches) by inhibiting methane production of methanogenic Archaea in the digestive tract thereof. The inhibiting of the critical biochemical pathways specific to the methanogenic Archaea is achieved by contacting the xylophage with one or more antimethanogenic reagent (AMR) compounds. The AMRs may include, for example, naturally-occurring statins (which may be found in red yeast rice) or derivatives thereof, linoleic acid or related compounds, essential oils, certain synthetic compounds or combinations thereof. As a result, the effectiveness of the methanogenic Archaea to produce methane is compromised. This subsequently results into the malfunctioning of the xylophages' digestive system and provides a safe, natural, green and sustainable means of controlling the xylophages.

19 Claims, 16 Drawing Sheets

(56) References Cited

OTHER PUBLICATIONS

U.S. Environmental Protection Agency, "Overview of Greenhouse Gases: Methane Emissions," 2014, available at https://www.epa.gov/ghgemissions/overview-greenhouse-gases#methane.
Cook, S.F., "The Respiratory Gas Exchange in Termopsis Nevadensis," Marine Biological Laboratory, Biological Bulletin vol. 63, No. 2 (Oct. 1932), 246-257.
Bignell, David E., et al., "Termites as Mediators of Carbon Fluxes in Tropical Forest: Budgets for Carbon Dioxide and Methane Emissions," Forests and Insects, Ch. 8, Edited by A.D. Watt, et al., Chapman & Hall (1997), 109-134.
Busquet, M., et al., "Effect of Garlic Oil and Four of its Compounds on Rumen Microbial Fermentation," American Dairy Science Association, J. Dairy Sci. 88:4393-4404 (2005).
Brune, A., et al., "Microecology of the Termite Gut: Structure and Function on a Microscale," Elsevier Science Ltd., 2000, 3:263-269.
Gomathi, V., et al., "Methan Emission by Gut Symbionts of Termites," Academic Journal of Plant Sciences 2 (3): 189-194,2009.
Fraser, G.R., et al., "Assessment of the Effects of Cinnamon Leaf Oil on Rumen Microbial Fermentation Using Two Continuous Culture Systems," American Dairy Science Association, J. Dairy Sci. 90:2315-2328 (2007).
Miller, Terry L., et al., "Inhibition of Growth of Methane-Producing Bacteria of the Ruminant Forestomach by Hydroxymethylglutaryl~SCoA Reductase Inhibitors," American Dairy Science Association, J. Dairy Sci. 84:1445-1448 (2001).
Morgavi, D.P., et al., "Microbial Ecosystem and Methanogenesis in Ruminants," The Animal Consortium, Animal (2010), 4:7,1024-1036.
Morvan, B., et al., "Quantitative Determination of H2-Utilizing Acetogenic and Sulfate-Reducing Bacteria and Methanogenic Archaea from Digestive Tract of Different Mammals," Springer-Verlag New York Inc., Current Microbiology, vol. 32 (1996), 129-133.
Sanderson, M.G., "Biomass of Termites and Their Emissions of Methane and Carbon Dioxide: A Global Database," American Geophysical Union, Global Biochemical Cycles, vol. 10, No. 4, 543-557, (1996).
Sharma, A., et al., "Structure modeling and inhibitor prediction of NADP oxidoreductase enzyme from Methanobrevibacter smithii," Biomedical Informatics, Bioinformation 6(1): 15-19 (2011).
Shinzato, N., et al., "Phylogenetic Diversity of Symbiotic Methanogens Living in the Hindgut of the Lower Termite Reticulitermes speratus Analyzed by PCR and In Situ Hybridization," Applied and Environmental Microbiology, vol. 65, No. 2, Feb. 1999, 837-840.

* cited by examiner

| Known reductive reactions of gut | $\Delta G^0 (kJ/e^-)$ |
|---|---|
| $4H^+ + 4e^- + O_2 \longrightarrow 2H_2O$ | -119 |
| $8H^+ + 8e^- + CO_2 \longrightarrow CH_4 + 2H_2O$ | -16.3 |
| $8H^+ + 8e^- + 2CO_2 \longrightarrow CH_3COOH$ | -13.1 |
| $8H^+ + 8e^- + N_2 \longrightarrow 2NH_3 + H_2$ | -5.5 |

|  | Methane Flux, Mt yr$^{-1}$ | | Carbon Dioxide Flux, Gt yr$^{-1}$ |
|---|---|---|---|
| Zimmerman et al. [1982] | 150 | (75-310) | 50 |
| Rasmussen and Khalil [1983] | < 50 | | ... |
| Collins and Wood [1984]* | 15 | (< 34) | 5 |
| Seiler et al. [1984] | 5 | (2-5) | 6[b] |
| Fraser et al. [1986] | 14 | (6-42) | ... |
| Rasmussen and Khalil [1987] | < 15 | | ... |
| Cicerone and Oremland [1988] | 40 | | ... |
| Khalil et al. [1990] | 12 | (2-20) | 4 |
| Judd et al. [1993] | 27 | (15-35) | ... |
| Martius et al. [1993] | 26 | (15-37) | ... |
| Hackstein and Stumm [1994] | 50.7 | (6-51)[c] | ... |
| Mugedo [1995] | 14 | | ... |
| This work | 20 | (18-22) | 3.5 (2.8-4.2) |

The range of values about the above estimates are given in parentheses.

*Derived by Khalil et al. [1990] from the data of Collins and Wood [1984] and Zimmerman et al. [1982].

[b]Derived by Khalil et al. [1990] from the data of Seiler et al. [1984].

[c]Four estimates were quoted by these authors: 5.6, 23.0, 8.5, and 50.7 Mt yr$^{-1}$.

FIG. 5

| Period | Gas Vol. (mL) | COD (mg/L) | pH | ORP (mV) | TDS (mg/L) |
|---|---|---|---|---|---|
| CONTROL | | | | | |
| Startup-Week 1 | 81 | 56 | 6.4 | -302 | 1213 |
| Startup-Week 2 | 72 | 91 | 6.3 | -306 | 1241 |
| Test-Week 1 | 75 | 61 | 6.2 | -289 | 1258 |
| Test-Week 2 | 73 | 108 | 6.3 | -296 | 1220 |
| TEST | | | | | |
| Startup-Week 1 | 79 | 72 | 6.2 | -285 | 1244 |
| Startup-Week 2 | 75 | 83 | 6.2 | -298 | 1265 |
| Test-Week 1 | 82 | 62 | 6.1 | -306 | 1263 |
| Test-Week 2 | 72 | 97 | 6.4 | -287 | 1247 |

FIG. 7

| Activity | Time (days) | Control (%) | Test (%) |
|---|---|---|---|
| dosed Test (40 mg/L) | 0 | 57 | 62 |
| | 2 | 61 | 47 |
| | 4 | 68 | 32 |
| | 6 | 59 | 20 |
| dosed Control (20 mg/L) | 7 | 65 | 13 |
| | 9 | 51 | 6 |
| | 11 | 31 | 0 |
| | 13 | 22 | 0 |
| | 15 | 8 | 0 |
| | 17 | 0 | 0 |

FIG. 8

| Time (days) | SF1 (no MIRYR) | SF1 (with 20% MIRYR) | SF2 (no MIRYR) | SF2 (with 10% MIRYR) |
|---|---|---|---|---|
| 0.5 | 1.0 | 0.0 | 1.0 | 0.0 |
| 1.5 | 1.0 | 2.0 | 7.0 | 8.0 |
| 5 | 5.0 | 5.0 | 0.0 | 5.0 |
| 12 | 1.39 | 0.79 | 0.94 | 0.86 |
| 19 | 3.217 | 1.40 | 2.685 | 2.023 |

SF: Single Formulation

| TEST | TREATMENT TESTED |
|---|---|
| 1 | Baseline Control (manure and groundwater only) |
| 2 | 4% Garlic Oil |
| 3 | 4% Cinnamon Oil |
| 4 | 4% Lemon Grass Oil |
| 5 | 4% Cinnamon Bark (dry powder) |
| 6 | 10% Garlic Oil |
| 7 | 10% Cinnamon Oil |
| 8 | 10% Lemon Grass Oil |
| 9 | 10% Cinnamon Bark (dry powder) |

FIG. 11

| Vial | Amount (g) Reagent Added | Methane (ug/L) | % change Methane | pH | ORP (mv) |
|---|---|---|---|---|---|
| Control | -- | 3,675 | -- | 5.31 | -54 |
| GO 4% | 0.776 | 3,180 | -13% | 5.58 | -159 |
| CO 4% | 0.799 | 3,095 | -16% | 5.61 | -100 |
| LO 4% | 0.799 | 2,910 | -21% | 5.50 | -61 |
| CB 4% | 0.798 | 2,820 | -23% | 5.16 | -35 |
| GO 10% | 1.951 | 2,610 | -29% | 5.27 | -119 |
| CO 10% | 2.001 | 2,710 | -26% | 5.39 | -71 |
| LO 10% | 2.013 | 3,675 | 0% | 5.87 | -74 |
| CB 10% | 2.001 | 2,100 | -43% | 5.17 | -26 |

*FIG. 12*

| Vial | Amount (g) Reagent Added | Methane (ug/L) | % change Methane | pH | ORP (mv) |
|---|---|---|---|---|---|
| Control | -- | 6,140 | -- | 5.18 | -62 |
| GO 4% | 0.774 | 2,445 | -60% | 5.28 | -169 |
| CO 4% | 0.798 | 3,180 | -48% | 5.57 | -122 |
| LO 4% | 0.801 | 3,285 | -46% | 5.19 | -73 |
| CB 4% | 0.804 | 2,145 | -65% | 4.96 | -45 |
| GO 10% | 1.948 | 2,520 | -59% | 5.08 | -163 |
| CO 10% | 2.019 | 2,530 | -59% | 5.43 | -113 |
| LO 10% | 2.008 | 3,560 | -42% | 5.54 | -96 |
| CB 10% | 1.999 | 4,400 | -28% | 5.54 | -43 |

FIG. 13

| Vial | Amount (g) Reagent Added | Methane (ug/L) | % change Methane | pH | ORP (mv) |
|---|---|---|---|---|---|
| Control | -- | 7,920 | -- | 5.23 | -74 |
| GO 4% | 0.778 | 2,030 | -74% | 5.12 | -173 |
| CO 4% | 0.812 | 4,700 | -41% | 5.77 | -116 |
| LO 4% | 0.808 | 2,720 | -66% | 5.08 | -61 |
| CB 4% | 0.802 | 2,950 | -63% | 4.96 | -46 |
| GO 10% | 1.946 | 1,635 | -79% | 5.23 | -198 |
| CO 10% | 2.017 | 4,120 | -48% | 5.46 | -131 |
| LO 10% | 2.004 | 5,420 | -32% | 5.10 | -43 |
| CB 10% | 1.999 | 5,270 | -33% | 5.03 | -22 |

FIG. 14

| Treatment | 30m | 1h | 2h | 3h | 4h | 1d | 2d | 3d | 4d | 5d |
|---|---|---|---|---|---|---|---|---|---|---|
| AMR | 0.0 | 0.0 | 0.0 | 0.0 | 0.0 | 0.2 | 0.2 | 0.4 | 0.4 | 0.4 |
| Control | 0.0 | 0.0 | 0.0 | 0.0 | 0.0 | 0.0 | 0.0 | 0.0 | 0.0 | 0.0 |

| Treatment | 6d | 7d | 8d | 9d | 10d | 11d | 12d | 13d | 14d |
|---|---|---|---|---|---|---|---|---|---|
| AMR | 0.6 | 2.4 | 4.0 | 7.4 | 10.0 | 11.4 | 12.6 | 13.6 | 13.8 |
| Control | 0.2 | 0.2 | 0.4 | 0.4 | 0.4 | 0.4 | 0.4 | 0.4 | 0.6 |

| Day | Negative Control – no carbon | PIR Positive Control - no AMR | PIR + GO (250 ppm) | PIR + GO (500 ppm) | PIR + GOS (250 ppm) | PIR + GOS (500 ppm) | PIR + GP (250 ppm) | PIR + GP (500 ppm) |
|---|---|---|---|---|---|---|---|---|
| 0 | 0.028 | 0.035 | 0.018 | 0.018 | 0.011 | 0.025 | 0.012 | 0.021 |
| 9 | 0.013 | 1.27 | 0.058 | 0.041 | 0.079 | 0.022 | 1.63 | 1.46 |
| 16 | 0.002 | 7.85 | 3.88 | 0.300 | 2.11 | 0.041 | 52.4 | 70.5 |
| 23 | 0.011 | 55.9 | 33.1 | 17.9 | 3.83 | 0.042 | 111 | 116 |

FIG. 18

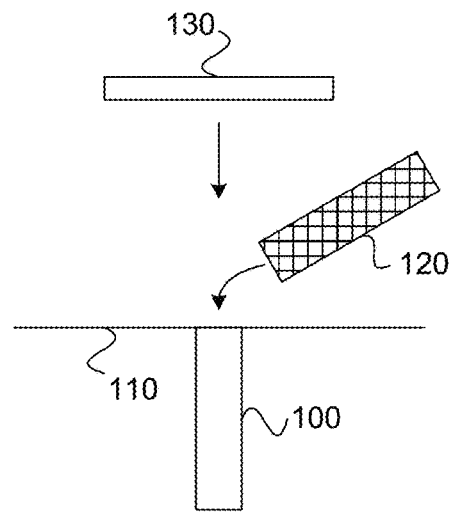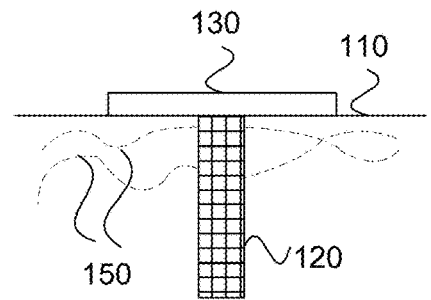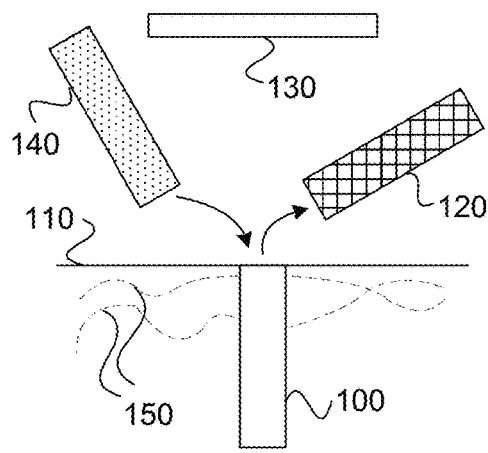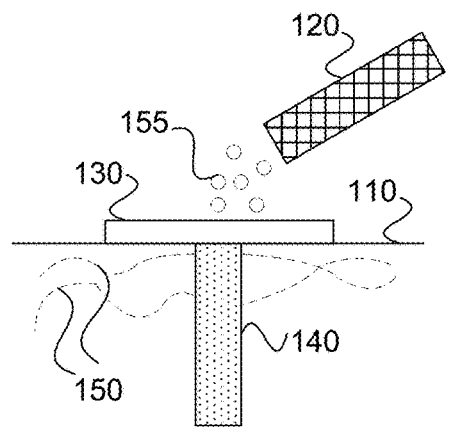
FIG. 20

XYLOPHAGE CONTROL USING ANTIMETHANOGENIC REAGENTS

PRIORITY

This application is a continuation-in-part (CIP) of, and claims priority to, U.S. application Ser. No. 15/269,903 filed on Sep. 19, 2016 which claimed the priority to U.S. Provisional Application 62/220,389 filed on Sep. 18, 2015. This application also claims priority to U.S. Provisional Application 62/497,710 filed on Nov. 29, 2016. Application Ser. No. 15/269,903; 62/220,389 and 62/497,710 are herein incorporated by reference in their entirety.

BACKGROUND

Natural methane ($CH_4$) emissions have gained much attention over the past few decades due to the importance of methane as a potent greenhouse gas. Methane's lifetime in the atmosphere is much shorter than carbon dioxide ($CO_2$), but $CH_4$ is more efficient at trapping radiation than $CO_2$ (i.e., pound for pound, the comparative impact of $CH_4$ on climate change is over 20 times greater than $CO_2$ over a 100-year period). Methane is emitted by natural sources such as wetlands, as well as human activities such as leakage from natural gas systems and the raising of livestock. In 2012, $CH_4$ accounted for about 9% of all U.S. greenhouse gas emissions from human activities (http://epa.gov/climatechange/ghgemissions/gases/ch4.html#content). Of the various sources for natural methane emissions identified, the wood-feeding termite group is arguably the most significant, to the point where termites have been reported to be the largest source of greenhouse gases (methane) emissions on the planet Earth.

Bacterial methanogenesis is a ubiquitous process in most anaerobic environments. There are three major substrates used by methanogens to produce methane: i) $CO_2$, ii) compounds containing a methyl group, or iii) acetate. The association of bacterial methanogenesis with anaerobic decomposition of organic matter in microbial habitats such as the intestinal tract of animals, sewage, sludge digester, muds of various aquatic habitat etc., has been well established. Thus, gas production commonly observed in nature is mainly the result of the growth of methanogens under specific energy sources that were formed as a result of microbial decomposition of organic matter.

Methanogens belong to the domain Archaea. The diversity of archaea found in the rumen of many organisms has been reviewed by many researchers. Most archaea identified in the rumen of animals belong to known methanogen clades with a predominance of *Methanobrevibacter* spp. The pooled data from several surveys show that the *Methanobrevibacter* clade accounts for nearly two-thirds of rumen archaea. The remaining one-third was composed, of roughly equal parts by phylotypes belonging to methanomicrobium and the rumen cluster C.

Most rumen methanogens do not contain cytochromes and although they are less efficient at obtaining energy through the production of methane than their cytochrome-containing relatives of the order methanosarcinales, they are better adapted to the environmental conditions prevailing in the rumen. They have a lower threshold for hydrogen ($H_2$) partial pressure, a faster doubling time, that can be as short as 1 h, and they have the potential to develop better at the mesophilic temperature and the near neutral pH of the rumen.

Termites are eusocial insects that belong to the order isoptera and play a major role in tropical ecosystems. Their basic food is plant matter, both living and dead. The main diet of most of the termite species consists of wood, foliage, humus or a mixture of these foods. While termites are the most commonly known herbivore whose diet consists mainly of wood, other examples of such wood eating insects (xylophage) include bark beetles, gribbles, horntails, shipworms, and wood-boring beetles. Because of this diet, many xylophage do great damage to unprotected wooden buildings. In addition to causing damage to wooden buildings, xylophage can damage crops such as for example *eucalyptus*, with attacks on leaves, roots and woody tissue. Likewise, xylophage can damage food crops such as for example cassava, coffee, fruit trees, and vegetables.

It is not known whether isopteran have a significant role in rumen methanogenesis but methanogens attached to the gut epithelium have been described in termites, and in such a microaerobic environment they are capable of producing methane and reducing oxygen at the same time.

Termites are divided into two groups, i) lower termites, and ii) higher termites. Lower termites is a group of six evolutionary distinct termite families (the microbial community in the gut of phylogenetically lower termites) comprising both flagellated protists and prokaryotes. Higher termites secrete their own digestive enzymes and are independent of gut microorganisms in their nutrition. The lower termites also possess this ability, but their production of cellulolytic enzymes is apparently inadequate. Hence, lower termites mostly depend on the activity of gut microorganisms for their nutrition, which are present in the hind gut region. Methanogens play a crucial role in this community of gut microbiota. If methanogens are disrupted or impeded the ecology of the system fails and the termite host organism (or other xylophage host organism) will suffer.

Methanogenesis is an important component of microbial carbon metabolism in the hind gut termite digestive system. Methanogenic bacteria share physiological and biochemical characters such as ability to anaerobically oxidize hydrogen and reduce carbon dioxide to methane. One of the most fascinating nutritional symbioses exists between termites and their intestinal microflora that permits termites to live by consumption of wood (xylophagy). The termite gut represents an excellent model of highly structured micro-environments. Apart from its natural role of conversion of woody and cellulosic substances into useful products of termite gut, microbiota contribute significantly to greenhouse gas effect through methane generation.

FIG. 1 illustrates a gut of a termite and reaction chains that are taking place therewithin. The adult termite gut consists of a fore gut (which includes the crop and muscular gizzard), a tubular mid gut (which as in other insects is a key site for secretion of digestive enzymes and for absorption of soluble nutrients) and a relatively voluminous hindgut (which is also a major site for digestion and for absorption of nutrients). The morphological diversity of the termite gut microbiota is remarkable and has been documented for both lower and higher termites. Although some bacteria colonize the foregut and midgut, the bulk of intestinal microbiota is found in the hindgut, especially in the paunch, which is, the region immediately posterior to the enteric valve. The hindgut compartments harbor the bulk of the intestinal microbiota. These tracts were initially considered as 'fermentation chambers' analogous to the rumen of sheep and cattle (e.g. anoxic environments for an anaerobic, oxygen-sensitive microbiota).

Researchers have reported that arthropod gut provides a suitable niche for microbial activity, but the nature of microflora and their distribution depended on the physicochemical conditions like pH, redox potential and temperature of that region. Further research supported that the presence of large number of aerobic, facultative and anaerobic microflora showed that hindguts are a purely anoxic environment together with steep axial pH gradients in higher termites. Among the different physiochemical conditions, pH and redox potential are the important factors which determine the type of microflora in the gut, while the pH of the foregut and midgut is around neutrality, whereas the paunch, colon and rectum appear to be slightly acidic.

FIG. 2 identifies known reductive reactions that occur in the gut of the termites. The most important metabolic activities traditionally attributed to the gut microbiota are (1) hydrolysis of cellulose and hemicelluloses, (2) fermentation of the depolymerization products to short-chain fatty acids, which are then resorbed by the host, and (3) intestinal nitrogen cycling and dinitrogen fixation. In the phylogenetically lower termites, a large fraction of hindgut volume (up to one-third of the body weight of a termite) is occupied by anaerobic flagellates, which phagocytize and degrade the wood particles comminuted by the termite. The phylogenetically higher termites do not harbor flagellates within their gut. Instead, an acquisition of cellulases with the food (in case of the fungus-cultivating termites) or a host origin of the cellulolytic activities has been suggested.

FIG. 3 illustrates a carbohydrate metabolism in wood and litter feeding termites. Termites are good sources of wood degrading enzymes such as cellulase-free xylanase, laccases that are potentially involved in phenolic compounds degradation suitable for paper and pulp industry and glucosidases. The metagenomic analysis of hindgut microbiota of higher termite shows the presence of diverse endoxylanases, endoglucanases, phosphorylases, glucosidases, nitrogenases, enzymes for carbon dioxide reduction and enzymes used in new ways for producing lignocelluloses based biofuels production and acetate production. Daily hydrogen turnover rates were 9-33 $m^3$ $H_2$ per $m^3$ hindgut volume, corresponding with the 22-26% respiratory activity of the termites. This makes $H_2$ the central free intermediate during lignocellulose degradation and the termite gut, with its high rates of reductive acetogenesis, the smallest and most efficient natural bioreactor currently known.

Termites inhabit many different ecological regions, but they are concentrated primarily in tropical grasslands and forests. Symbiotic micro-organisms in the digestive tracts of termites (flagellate protozoa in lower termites and bacteria in higher termites) produce methane. Termites emit large quantities of methane, carbon dioxide and molecular hydrogen into the atmosphere. Significant studies have been performed on diversity, social structure, physiology and ecology of the termites as source of methane contributing to the sources of atmospheric greenhouse gas. Methane production by termites was first reported by Cook (1932) who observed the evolution of a gas from a species of termite.

FIG. 4 illustrates the results of studies showing large variations in amount of methane produced (in a termite's digestive track during the breakdown of cellulose by symbiotic micro-organisms) for different species. Research also found average methane production rates of 0.425 µg $CH_4$/termite/day for the lower termite species and 0.397 µg $CH_4$/termite/day for the higher termite families. Environmental conditions such as light levels, humidity, temperature, as well as carbon dioxide and oxygen presence play a key part in methane production. Termites prefer the absence of solar radiation, an immobile atmosphere, saturated or nearly saturated, relative humidity, high and stable temperatures and even elevated levels of carbon dioxide. Although termite populations are active in the middle latitude environments, the vast concentrations of mounds and nests are found in the lower latitude tropical forests, grasslands and savannahs of Africa, Asia, Australia and South America. It is estimated that these regions contribute approximately 80% of global termite emissions.

Researchers performed laboratory experiments using termite mounds under glass enclosures, with varying diet patterns and temperatures, while all other variables remained stable. It was found that the capacity of termites to produce methane varied from species to species, within groups from different mounds or nests of a particular species. But all species produced methane which indicates that methanogens are active components of their biology. The six different species studied produced methane at rates that ranged over more than two orders of magnitude. Raising the temperature by 5° C. within each species' caused a 30-110% increase in the measured methane emissions. Prior laboratory and field research seems to show that termites preferred temperatures in excess of 10° C. above the ambient air temperatures, determined by their geographical locations. A positive correlation between amounts of biomass consumed and methane emitted was observed, with the average being 3.2 mg $CH_4$ per gram of wood.

Methanogenic bacteria have been associated with protozoa in termites. Though methanogens are generally strict anaerobes, their metabolic responses to the presence of oxygen and their sensitivity to it vary with the species. *Methanobacterium* sp. was isolated from the termite hindgut. *Methanobrevibacter cuticulam* and *M. curvatus* were isolated from the hindgut of the termite *Reticulitermes flaviceps*. The presence of *M. arboriphilicus* and *Methanobacterium bryantii* in the guts of wood eating higher termites has also been reported.

Termite guts are the world's smallest bioreactors. The presence of carbohydrate-fermenting bacteria and protozoa, high levels of volatile fatty acids in the gut fluid and the occurrence of typical anaerobic activities such as homoacetogenesis and methanogenesis resemble the situation encountered in the rumen of sheep and cattle.

Methane is a metabolic end product in the hindgut of most termites. It has been estimated that these insects contribute approximately 2 to 4% to the global emissions of this important greenhouse gas. Methanogenic archaea, which are easily identified by their coenzyme $F_{420}$ autofluorescence, have been located in several microhabitats within the hindgut. Depending on the termite species, these organisms can be associated either with the hindgut wall or with filamentous prokaryotes attached to the latter, or they can occur as ectosymbionts or endosymbionts of certain intestinal flagellates.

FIG. 5 illustrates annual emissions of methane and carbon dioxide in the atmosphere by termites as calculated by various researchers. The annual emission rates of methane and carbon dioxide were estimated by researchers using the equation $P=C\Sigma_{i=1}^{n}A_iB_iF_i$ where, P is the annual emission of the trace gas (in grams), $A_i$ is the area of an ecological region (in square meters), $B_i$ is the biomass of termites in that region (in grams per square per square meter) and $F_i$ is the flux of the trace gas (in grams of gas per grams of termites per hour).

FIG. 6 illustrates a termite's life cycle. As a termite grows and develops, methanogens clearly play an integral role in the reproduction, growth, development and overall activity of the organism. The microbes play similar roles in the life-cycles of other wood-boring insects (xylophage) and cellulose consumers such as bark beetles and wood-boring beetles.

A series of termite control methods have been implemented historically with varying measurements of success. A brief description of those techniques is presented below.

Fumigation: Fumigation ("tenting") has been the only method used for over forty years which insures complete eradication of all drywood termites from a structure. The phase-out of methyl bromide in the U.S. has positioned sulfuryl fluoride as the leading gas fumigant. Fumigation is a highly technical procedure which involves surrounding the structure with a gas-tight tarpaulin, releasing the gas inside the seal, and aerating the fumigant after a set exposure time.

Heat: Heat treatments are used to eradicate drywood termites. During the heat treatment the infested area is cordoned off with polyethylene or vinyl sheets. Temperature probes are placed in the hardest-to-heat locations and heat is applied with a high-output propane heater. After a lethal target temperature is achieved, the area can be cooled quickly.

Cold: Excessive cold is primarily applied by using liquid nitrogen, which is pumped into the targeted area until the temperature drops to a level lethal to drywood termites. Temperature probes are used to insure that lethal temperatures are attained.

Wood Injection: Wood injection or "drill-and-treat" applications have been used since the 1920s to treat drywood termite infestations which are accessible and detectable. An insecticide is injected into small holes drilled through any wood surface into termite galleries delivering the treatment directly to the pest population. This is the simplest and most direct method of treatment. The amount of drilling required and the effectiveness of this treatment depend on the chemical used and the nature of the infestation. Most chemicals will remain active in the wood after treatment to thwart resurgent colonies.

Borates: Spray and foam applications of products containing boron salts are applied to raw, uncoated wood surfaces. Because penetration depths of borate solutions and depth of drywood termite galleries vary, injections into existing infestations are usually being performed.

Microwave: Microwave energy, applied to relatively small sections of infested wood, kills termites by heating them. Thermocouples are inserted into treated members to ensure that adequate microwave energy is delivered.

Electrocution: The probe of a hand-held "gun" is passed slowly over the infested wood surface and inserted directly into pellet "kick-out" holes. The high voltage and low current energy emitted by the probe electrocutes termites in the immediate application area. There is no way to measure a lethal dose at a given location in wood with this device. In some cases, holes must be drilled into wood and wires inserted to improve penetration.

Bates: Are one of the most common delivery methods and involve use of containers (referred to as stations or stakes) inserted into the earth which contain feed or bait. The baits consist of paper, cardboard, or other palatable food. A user will periodically check the station to see whether xylophages are active on the feed or the bait. Some of the methods use non-poisonous inceptor along with the bait/feed in the beginning for detection. Once detection occurs (activity is found), poisonous materials are added to the bait/feed.

The bait must be "tasty" enough that termites will readily consume it, even in the presence of competing tree roots, stumps, woodpiles and structural wood. If the bait kills too quickly, sick or dead termites may accumulate in the vicinity of the bait stations, increasing the chance of avoidance by other termites in the area. Delayed-action also enhances transmission of the lethal agent to other termites, including those that never fed on the bait. Entire colonies can be eliminated in this manner, although total colony elimination is not always necessary to afford structural protection.

Sprays: The lethal compounds could also be made into a spray for use on susceptible wood surfaces or surfaces exhibiting infestation where pests need to be controlled. It could also be incorporated into a sugar solution and applied to the surfaces.

Barriers: Another commonly used method involves building a barrier around the property to be protected so that termites will not be able to enter the property. A barrier can be chemical to kill or repel termites or physical that uses materials such as for example mesh sheets that termites cannot pass. Commonly used chemical barriers for termites include Termidor® brand pesticide offered by BASF Corporation, 26 Davis Drive, Research Triangle Park, N.C. 27709 and Premise® brand pesticide offered by Bayer CropScience LP, 2 T.W. Alexander Drive, Research Triangle Park, N.C. 27709.

BRIEF DESCRIPTION OF THE DRAWINGS

FIG. 5 illustrates the annual emissions of methane and carbon dioxide in the atmosphere by termites that have been calculated by various researchers.

FIG. 7 is a table that lists the volume of biogas production, pH values, and the concentrations of COD, ORP, and TDS measured in the Control and Test reactors during laboratory study one.

FIG. 8 is a table identifying the methane content measured in the biogas generated in the reactors during the 17-day study period of laboratory study one.

FIG. 11 is a table that defines the tests performed for different essential oils in laboratory study three.

FIGS. 12-14 are tables showing the results of the FIG. 11 tests for the 3 time intervals (day 3, day 7 and day 12 respectively).

FIG. 18 is a table of the methane concentration in the control and test samples for laboratory study five.

FIG. 20 illustrates an example feed bait process.

DETAILED DESCRIPTION

Figures 1, 2:
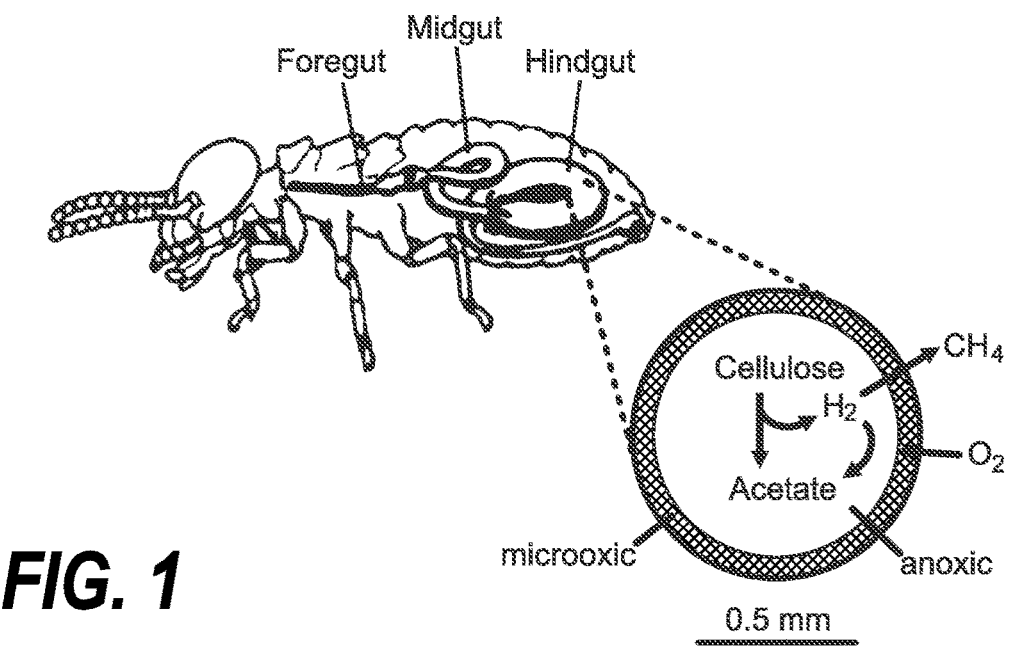
FIG. 1 illustrates a gut of a termite and reaction chains that are taking place therewithin.
FIG. 2 identifies known reductive reactions that occur in the gut of the termites.
Figure 3:
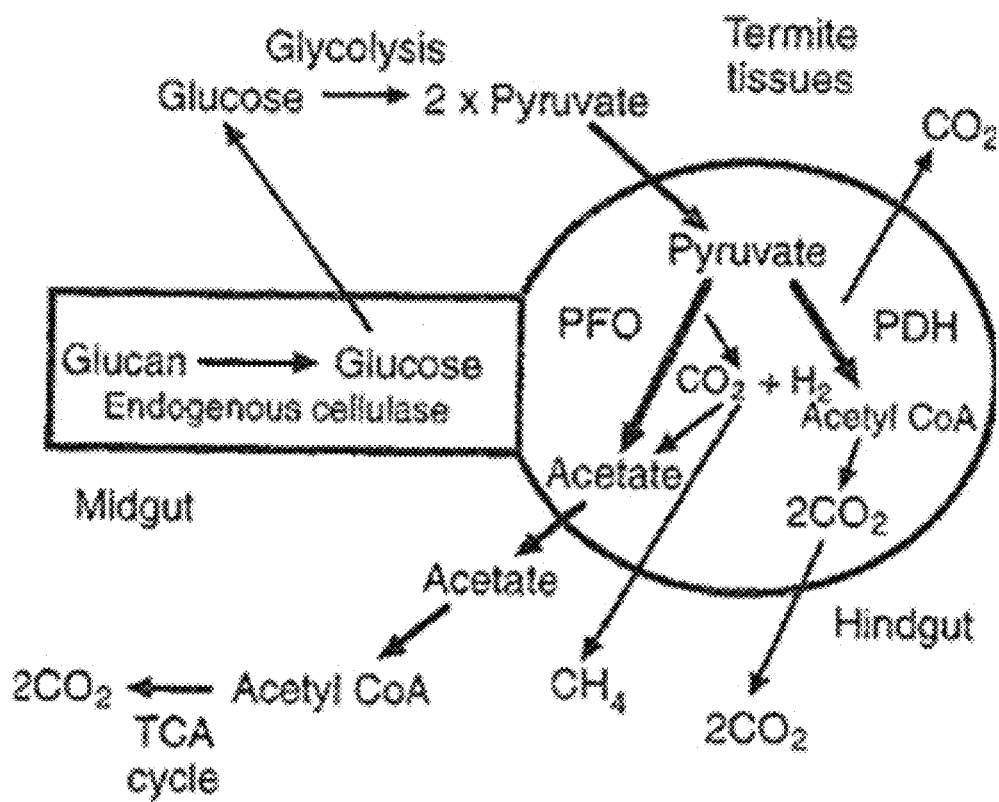
FIG. 3 illustrates a carbohydrate metabolism in wood and litter feeding termites.
Figure 4:
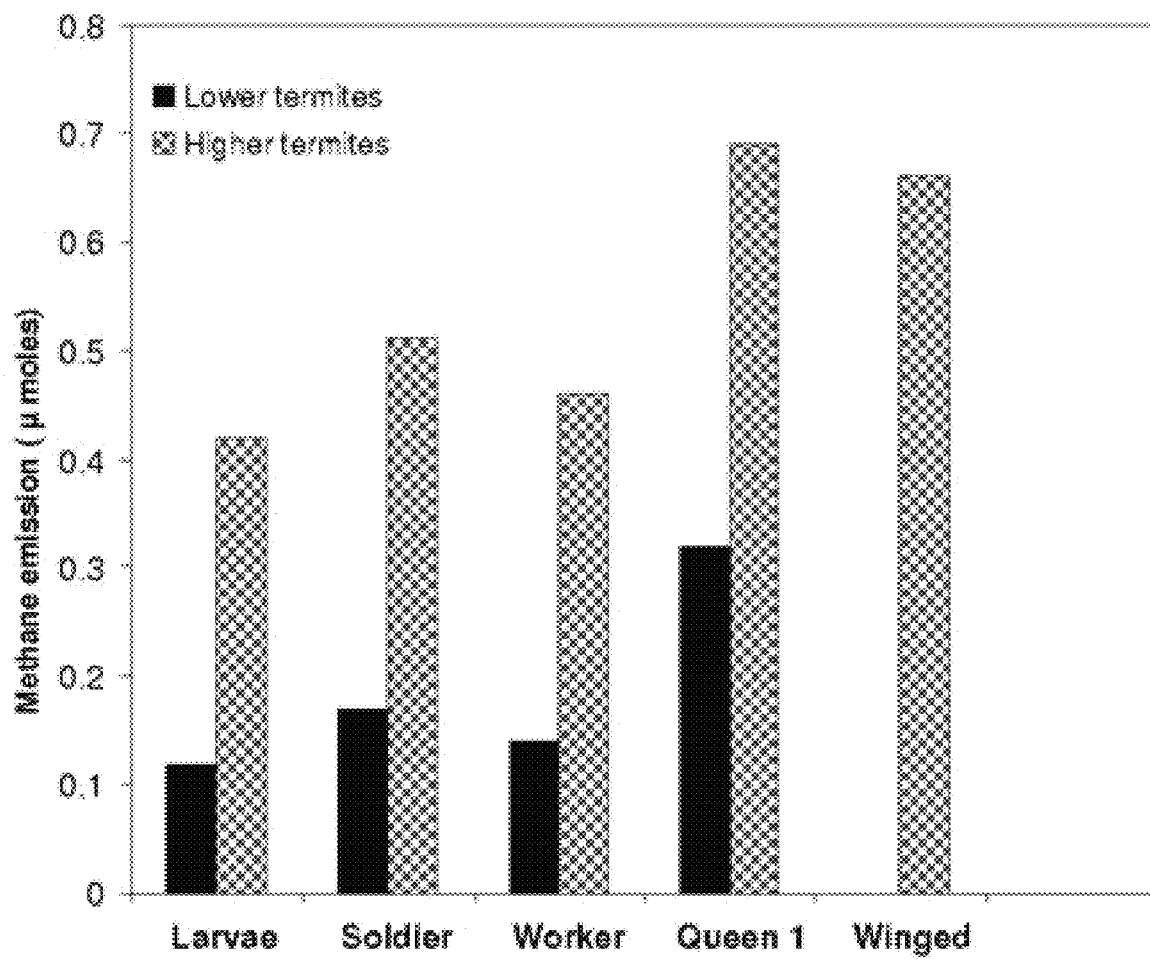
FIG. 4 illustrates the results of studies showing a large variations in amount of methane produced for different species.
Figure 6:
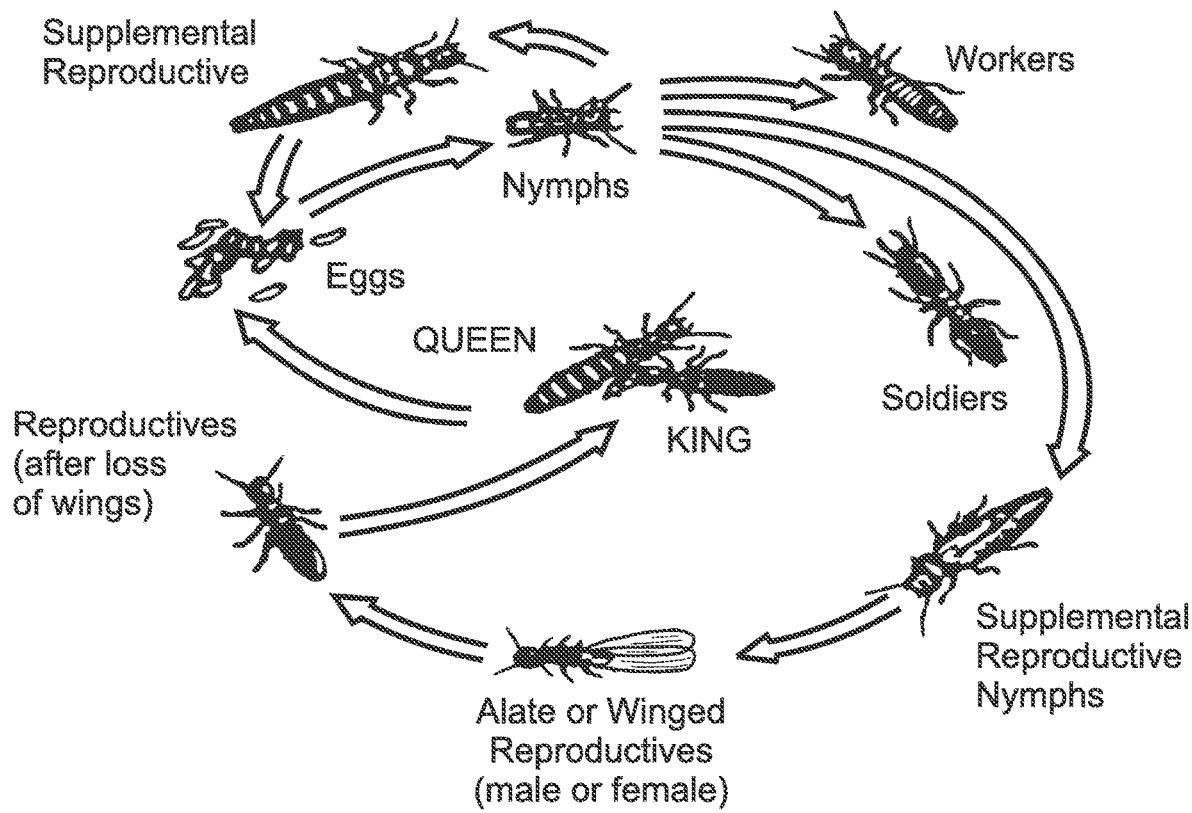
FIG. 6 illustrates a termite's life cycle.

Methane fermentation is a versatile biotechnology capable of converting almost all types of polymeric materials to methane and carbon dioxide under anaerobic conditions. This is achieved as a result of the consecutive biochemical breakdown of polymers to methane and carbon dioxide in an environment in which a variety of microorganisms which include fermentative microbes (acidogens); hydrogen-producing, acetate-forming microbes (acetogens); and methane-producing microbes (methanogens) harmoniously grow and produce reduced end-products. Anaerobes play important roles in establishing a stable environment at various stages of methane fermentation.

The methanogenic Archaea (methanogens) occupy a variety of anaerobic habitats, where they play essential roles in the conversion of hydrogen and other intermediates to methane. Most species are capable of reducing carbon dioxide ($CO_2$) to a methyl group with either a molecular hydrogen ($H_2$) or formate as the reductant. Methane production pathways in methanogens that utilize $CO_2$ and $H_2$, involve specific methanogen enzymes, which catalyze unique reactions using unique coenzymes.

Several cofactors are involved in biological methane formation. Coenzyme B (HS-CoB, 7-mercaptoheptanoylthreonine phosphate) and coenzyme $F_{420}$ (a 5-deazaflavin derivative with a mild point potential of −360 mV) function as electron carriers in the process of methanogenesis. $F_{420}$ is the central electron carrier in the cytoplasm of methanogens, which replaces nicotinamide adenine dinucleotides in many reactions.

Methanogenesis from $H_2+CO_2$, formate, methylated $C_1$-compounds and acetate, proceeds by a central, and in most parts reversible pathway. When cells grow on $CO_2$ in the presence of molecular hydrogen, carbon dioxide is bound to methanofuran (MFR) and then reduced to formyl-MFR. This endogenic reaction is driven by the electrochemical ion gradient across the cytoplasmic membrane. In the next step the formyl group is transferred to $H_4MPT$ and the resulting formyl-$H_4MPT$ is stepwise reduced to methyl-$H_4MPT$. Reducing equivalents are derived from reduced $F_{420}$ ($F_{420}H_2$), which is produced by the $F_{420}$-reducing hydrogenase using hydrogen as a reductant. Furthermore, $F_{420}H_2$ is the electron donor for $F_{420}H_2$-dependent methylenetetrahydromethanopterin dehydrogenase (Mtd), one of two enzymes that reduce methenyl-$H_4MPT$. The other enzyme, $H_2$-dependent methylenetetrahydromethanopterin dehydrogenase (Hmd), uses $H_2$ directly. mRNA abundance for mtd increased markedly under hydrogen-limited growth conditions, suggesting that Mtd may be more important when $H_2$ is limiting.

Sharma et al. (2011) determined a 3D model structure of the $F_{420}$-dependent NADP oxidoreductase enzyme from *M. smithii*. Based on their protein model, they detected that these residues are making a ligand binding site pocket, and they found that ligand $F_{420}$ binds at the protein cavity. The inhibitor compounds lovastatin and compactin (mevastatin) show more affinity for the model protein as compare to the natural ligand $F_{420}$. They share the same cavity as by $F_{420}$ and surround by similar residues. Therefore, the inhibitor compounds lovastatin and compactin (mevastatin) were very effective in blocking the activity site for methane production since the enzyme was unable to bind with the substrate, resulting in decreased methane production.

Monacolin K, as an example statin, can also inhibit methanogenic archaea because cell membrane production in archaea shares a similar pathway with cholesterol biosynthesis (Miller and Wolin, 2001). More specifically, bacterial cell walls are predominantly comprised of murein (peptidoglycan). Archaea, however, do not produce murein. Rather, their cell walls are composed of various sulfated-heteropolysaccharides, proteins and glycoproteins/lipids along with pseudomurein. Archaea are distinct in their use of pseudomurein for cell wall construction. Pseudomurein is a structural analogue of murein which is biosynthesized via activity similar to that of HMG-CoA reductase which yields cholesterol in humans.

In the presence of a statin, pseudomurein biosynthesis pathway is interrupted in methanogens. Accordingly, the methanogens are restricted from growth and proliferation. And since methanogens are so uniquely different than bacteria, the inhibitory effect of statins is not observed in microbes.

The compound 3-hydroxy-3-methylglutaryl coenzyme A (HMG-CoA) reductase, is another enzyme that is very critical in methane production, and Archaea are the only bacteria known to possess biosynthetic HMG-CoA reductase (Miller and Wollin, 2001). Garlic oil has been hypothesized to inhibit the biosynthesis of HMG-CoA (Busquet et al., 2005; Fraser et al, 2007). At higher concentrations, various essential oils have exhibited wider range anti-microbial activity so the dosage and applications strategies are wide and variable.

Antimethanogenic reagents (AMRs) are compounds designed to inhibit methane production in environments where methanogens are established and active. It is believed that AMRs could inhibit the methane production in the gut of termites and other xylophages (wood-boring and cellulose digesting pests). Limiting the production of methane causes disfunctioning of the pests' digestive system thus impeding their growth and development. The impediment of their growth and development would thus make this an effective non-toxic method of controlling termites and other xylophages.

AMRs may include one or more unique compounds that either alone or in combination with one another effect the production of methane. Red yeast rice is believed to be an AMR as it provides a naturally occurring statin. In order to determine the effectiveness of red yeast rice for inhibiting methane, two bench scale studies were performed.

Laboratory Study 1

Two anaerobic reactors were utilized, a control and a test reactor. The two reactors were seeded with biomass treating expired dietary supplement, which contained an active methanogenic population. The reactors were fed once per week, and were operated as anaerobic sequencing batch reactors.

During the first week of startup, the reactors contained only the methanogenic culture, without soil. After one week, silty sand was added, resulting in a slurry having a solids concentration of 20% by weight. The reactors were operated for another week with the silty sand, to ensure that the sand did not affect methanogenic activity. The bioreactors were 2.5 L in volume, containing 2 L of slurry. The reactors were airtight and were especially designed for anaerobic reactions. The reactors were maintained at laboratory temperature 22° C.-24° C. The reactors were operated by feeding with dietary supplement once a week. The target initial chemical oxidation demand ("COD") concentration after feeding was 2000 mg/L.

Throughout the week, the volume of biogas produced was measured as follows. A syringe was inserted periodically into a septum-filled port in the top of the reactor to collect a gas sample for methane content. The methane content of the biogas samples was then quantified by injecting into a gas chromatograph with a flame ionization detector (GC-FID). The reactors had dedicated probes to measure pH and oxidation reduction potential ("ORP"). After each cycle (i.e., before feeding), a probe was inserted into the reactor to measure total dissolved solids ("TDS"), and a sample was collected to measure COD. The mixer was turned off during sampling and feeding to minimize the introduction of oxygen into the reactor contents.

The test reactor was initially dosed with a 40 g/L concentration of red yeast rice. One week later the control was dosed with 20 mg/L red yeast rice.

Results for Laboratory Study 1

The first two weeks of the studies were the startup period, and the second two weeks were the test period. The startup period established the methanogenic population in the two reactors. During the first week of startup, the reactors were operated without the silty sand, and the second week they were operated with the silty sand (20% by weight). The test period started with the dosing of the test reactor with red yeast rice (40 g/L). During the first week of the test period the control was maintained as a proper control, with no red yeast rice added. Because the 40 mg/L dose of red yeast rice reduced methane production in the test reactor, it was decided to dose the control reactor with 20 g/L of red yeast rice during the second week of the test period. The test period lasted 17 days.

FIG. 7 is a table that lists the volume of biogas production, concentrations of COD, pH values, and the concentrations of ORP and TDS measured in the control and test reactors during the studies. The volume of biogas produced each feed cycle (i.e., each week) in the reactors ranged between 72-82 mL. It is notable that the volume of gas was not affected by the introduction of silty sand during week 2 of the startup period. The addition of 40 mg/L of red yeast rice to the test in the first week of the test period and the addition of 20 mg/L of red yeast rice during the second week of the test period did not appreciably impact biogas volume in the reactors. The COD measurements after each sequencing batch reactor cycle ranged from 56 to 108 mg/L. The reactors were fed 2000 mg/L each cycle, so the COD concentrations demonstrate that the COD was consumed by the anaerobic culture. Values of pH ranged between 6.1 and 6.4. Values of ORP were all close to −300 mV, which is typical of methanogenic conditions. The TDS in the reactors ranged from approximately 1200 to 1250 mg/L.

Figures 9, 10:
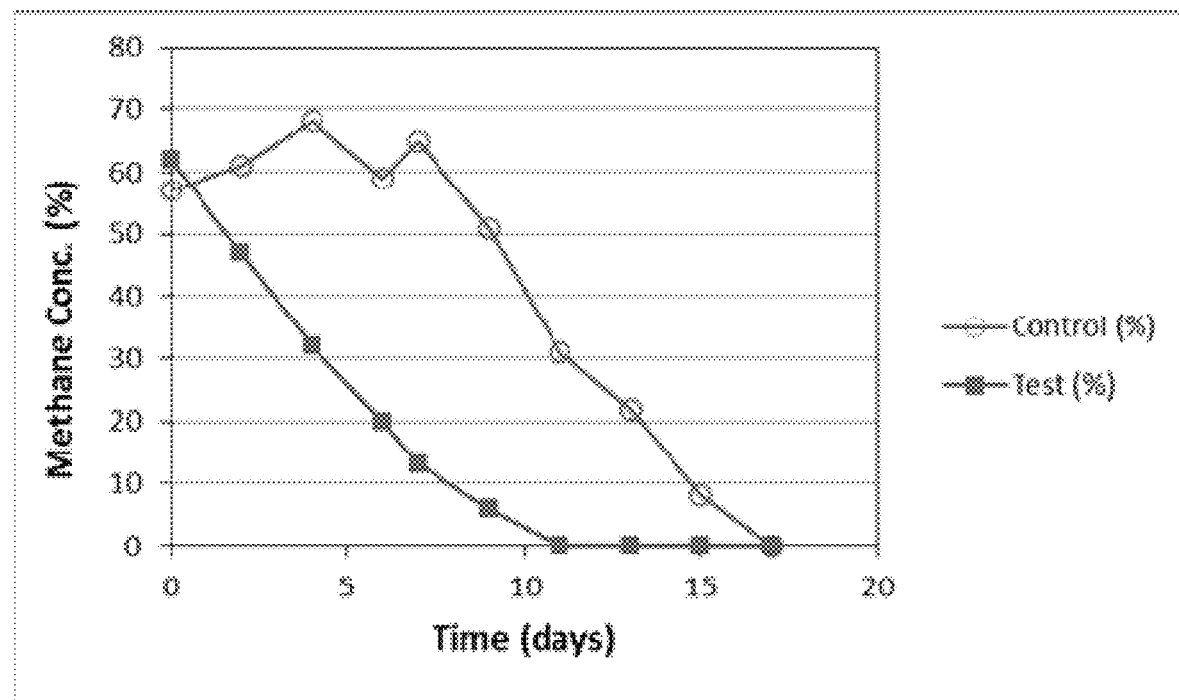
FIG. 9 is a graph of the methane concentrations listed in FIG. 8.
FIG. 10 is a table that lists the methane content measured in the biogas generated in the reactors during the 19-day study period of laboratory study two.

FIG. 8 is a table and FIG. 9 is a graph of the methane content measured in the biogas generated in the reactors during the 17-day test period. While not captured in FIG. 8 or 9, during the Startup Period, methane concentrations varied from approximately 55% to 70%, which indicates an active methanogenic culture. The red yeast rice dose of 40 mg/L in the Test reactor reduced the methane content of biogas from 62% to below detection (0.05%) after 11 days. The methane concentration remained below detect in the Test reactor until day 17, when the reactors were dismantled. The red yeast rice dose of 20 mg/L in the Control reactor on day 7 reduced the methane content of biogas from 65% to below detection (0.05%) by day 17 (i.e., after 10 days). During the Test period, the volume of biogas produced in the Test and Control reactors did not change appreciably only the methane concentration of the biogas was changed.

Laboratory Study 2

Two test aliquots were prepared under a nitrogen atmosphere in a glove box as follows: (1) a 240 mL amber glass screw-cap septum bottle was filled with 100 g of dry soil (~70 mL); (2) deoxygenated deionized water was slowly added to the soil to saturate the soil; an additional 40 mL of water was then added to the soil; and (3) manure slurry was added to yield a 1 weight percent manure dose to the soil.

Once the bottle was sealed it was removed from the glove box. The soil was kept in the dark (by wrapping with foil) at room temperature (~22° C.). A needle connected to a polyethylene tube was pushed through the bottle septum and the tube outlet was placed in an inverted graduated cylinder in a water bath. The gas generation rate was recorded as the water was displaced over a period of 10 days.

The methane reduction trial included two sample formulations, with and without red yeast rice, for a total of 4 samples. The bottles were sampled 0.5, 1.5, 5, 12, and 19 days following the sample preparation.

Results for Laboratory Study 2

FIG. 10 is a table that lists the methane content measured in the biogas generated in the reactors during the 19-day study period. The first soil formulation (SF1) without red yeast rice measured a methane content of 3,217 after 19 days compared to the SF1 that contains 20% red yeast rice (approximately 40 mg/L in solution) which measured a methane content of 140. The 20% red yeast compound showed great effectiveness in inhibiting the methane production by 96% during the 19-day sampling interval. Similarly, the second soil formulation (SF2) with 10% red yeast rice resulted into a 25% decrease in methane production compared to SF2 without red yeast rice (reduced from 2,685 to 2,023).

The above tests clearly illustrate the effectiveness of red yeast rice in inhibiting methane. By contacting the termites with red yeast rice (e.g., having the termites digest the red yeast rice) it is believed that this would provide a green, organic and non-toxic (to humans) way to control damage and pestilence induced by xylophages (wood-boring and cellulose digesting pests) that harbor methanogens in order to digest or metabolize cellulose.

Utilizing organic statins (some of which can be present in red yeast rice extract as well as biomass of other organisms) may inhibit the methanogenic enzyme and coenzyme systems essential to the growth and development of wood-boring insects. Thus disrupting their digestive tracts/life-cycle stages by limiting their effectiveness in producing methane and causing disfunctioning of the pests' digestive system thus impeding their growth and development.

Essential oils and/or saponins are also believed to be AMRs. Laboratory studies were performed to comparatively evaluate the anti-methanogenic potential of multiple essential oils (e.g., Garlic Oil [GO], Cinnamon Bark Oil [CO], Cinnamon Bark Powder containing 4% CO [CB] and lemongrass Oil [LO]).

Laboratory Study 3

Manure and groundwater samples were collected from a site in Monticello, Wis. at 1:1 ratio. The collected samples were added to 125 mL amber glass bottles equipped with PTFE-lined open septum caps (VOA vials). The testing program included 40 vials each filled with 20 g manure slurry and 20 g groundwater. All samples were sacrificial and disposed after completion of the analyses. Five (5) vials were used to indicate the onset of anaerobic conditions by measuring pH, ORP and methane over a 2-week period.

FIG. 11 is a table that defines the tests performed. A total of 27 vials were prepared to analyze the 9 tests defined in FIG. 11 over 3 time intervals (day 3, day 7, day 12). Finally 8 vials were setup as replicate samples.

Gas samples from the sample container headspace were analyzed for methane in the gas phase using a gas chromatograph (GC) with a flame ionization detector (FID). After these analyses were completed, pH and ORP were also measured.

Results for Laboratory Study 3

Figure 15:
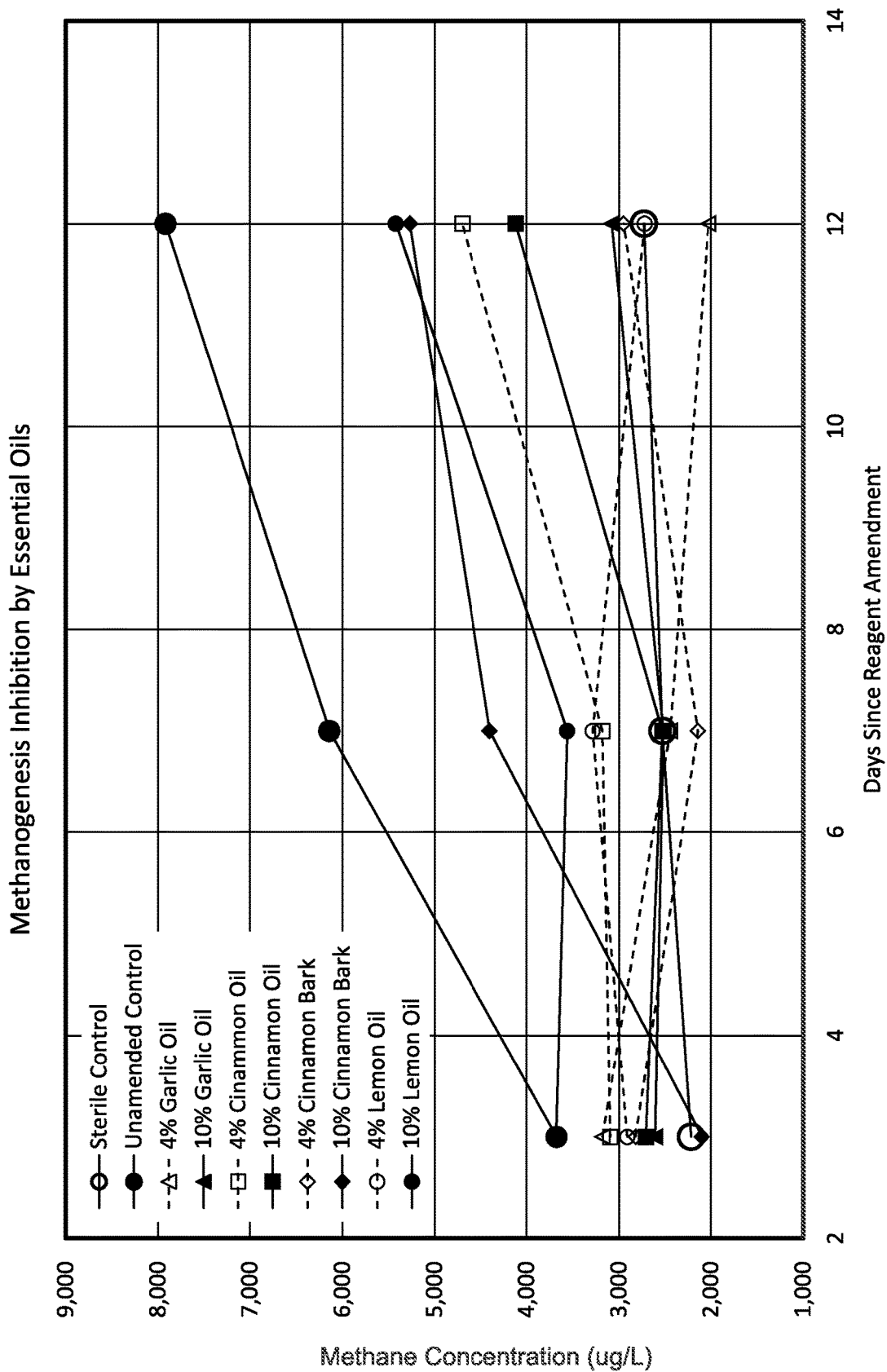
FIG. 15 is a graph showing the results for the tests of FIG. 11 for the different time intervals.

FIGS. 12-14 are tables showing the results of the 9 tests for the 3 time intervals (day 3, day 7 and day 12 respectively). FIG. 15 is a graph showing the results for all the tests for the different time intervals. As illustrated, it is apparent that all essential oils were successful in decreasing the amount of methane produced, with the Garlic Oil appearing to be the most effective of all.

Laboratory Study 4

Laboratory studies conducted by an independent third-party (Department of Entomology—Texas A&M University) tested garlic oil as on AMR on native subterranean termites (*Reticulitermes flavipes*). An aqueous solution containing 0.03% garlic oil was used to treat: i) sand used in a glass tube bioassay (data not shown—inconclusive due to loading), and ii) filter paper used in a direct feeding assay. All data were analyzed using IBM SPSS v 24. A Student's T-test was preformed to analyze the mean mortality in both experiments, and the mean distance tunneled in the glass tube bioassay.

Five circular sheets of filter paper, 70 mm in diameter, were treated with approximately 0.75 ml of 0.03% AMR (garlic oil) solution and allowed to air dry for 12 hours. Water was added to the filter paper sheets used in the five control replications. The sheets of filter paper were placed into arenas consisting of 90 mm Petri dishes, and 40 termite worker termites and 2 soldiers were introduced. All replications were housed inside a plastic shoebox containing moist paper towels to maintain a high level of humidity and prevent desiccation. Mortality counts were taken at 30 minutes, 1, 2, 3 and 4 hours, then daily for 14 days. At the end of trial, etching or feeding on the filter paper was noted. On Day 8, approximately 0.5 ml of water was added to each replication to prevent desiccation.

Results for Laboratory Study 4

Figures 16, 17:
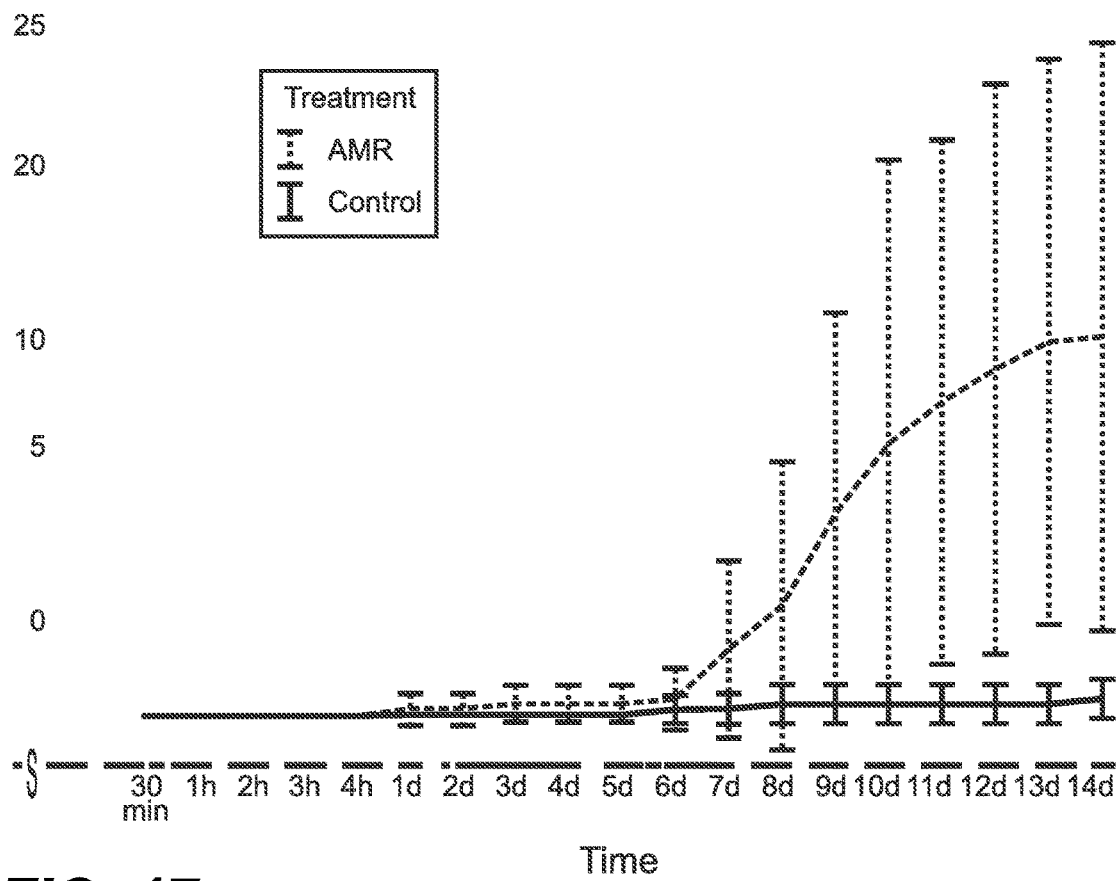
FIG. 16 is a table of the mean termite mortality rates for the control replications and the replications with AMR for laboratory study four.
FIG. 17 is a graph of the mean mortality rates listed in FIG. 16.

Termites exposed to filter paper treated with garlic oil AMR showed significantly higher mortality rates after 9 days of exposure, and remained significantly different from the control replications until the end of the trail. FIG. 16 is a table and FIG. 17 is a graph of the mean mortality rates for the control replications and the replications with AMR. Very little feeding was observed on the treated filter paper sheets, much less than that was observed in the control replications. Etching of the filter paper was visibly concentrated in the areas with the least amount of AMR product absorption; little to no feeding was seen where the application was more evenly distributed throughout the filter paper. It was noted that after Day 7, mold was seen in all treatment replications.

An independent, third-party review of the data was conducted by a professional entomologist associated with the USDA-ARS Insect Research Unit and the University of Delaware (not an official opinion of either institution) who stated that: "Proof of concept of the inhibitory activity of AMR on methanogenic bacteria species has been demonstrated in large mammals, such as goats and cattle. At the genus level, *Methanobrevibacter* is a predominant Archaea in the rumen and this organism is significantly inhibited with the supplementation of AMR. These same Archaea also colonize the guts of cockroaches which, similar to termites, are also significant residential pests. The results obtained are very promising and the concept of using AMR technology to manage xylophages is very sound".

Saponins, essential plant oils, and/or naturally occurring statins (e.g., such as those found in red yeast rice) however, can be challenging to process, can have limited longevity in the field, have a specified mode of action, and they can be prohibitively expensive.

Certain synthetic compounds also believed to be AMRs. The synthetic compounds may be quicker, easier and cheaper to produce and may have a different mode of operation than other AMRs. For example, diallyl disulfide, diallyl trisulfide, and ethyl propionate are believed to interfere with the biosynthesis of psuedomurein by symbiont Archaea (methanogens).

Diallyl disulfide has a chemical formula $C_6H_{10}S_2$ and is also known as garlicin. Garlicin is produced from sodium disulfide and allyl bromide or allyl chloride at temperatures of about 40-60° C. in an inert gas atmosphere as indicated in the below reaction.

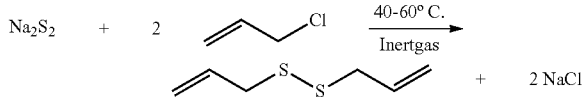

The sodium disulfide is generated in situ by reacting sodium sulfide with sulfur. The reaction is exothermic and its theoretical efficiency of 88% has been achieved.

Diallyl trisulfide has a chemical formula $S(SCH_2CH=CH_2)_2$ and is also known as allitridin. Allitridin is produced in a similar manner to garlicin and has the below structural formula.

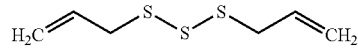

Ethyl propionate is an ethyl ester of propionic acid and has a chemical formula $C_2H_5(C_2H_5COO)$ and the below structural formula.

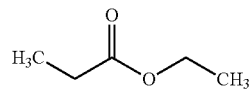

The synthetic compounds may in part control Archaea via interference with psuedomurein production, which is a protein unique to a methanogen and is critical to its long term viability and function. This mode of action differs from other reported means of controlling methanogenesis, and therefore represents an improved method when used alone or in conjunction with other processes. Expanded control mechanisms can offer improvements in longevity and overall efficacy of controlled methanogenesis.

Laboratory Study 5

Use of diallyl sulfide, which may be considered a synthetic garlic oil (GOS), was evaluated for its ability to control Archaea compared to the effects of other potential AMRs such as natural/pressed Garlic Oil (GO) and dehydrated Garlic Powder (GP). Control samples with and without contaminants were captured along with test samples that included contaminants and different concentrations (250 ppm and 500 ppm) of different AMRs (GO, GOS and GP).

The concentration of methane in each of the samples was measured at 0, 9, 16 and 23 days.

Results of Laboratory Study 5

Figure 19:
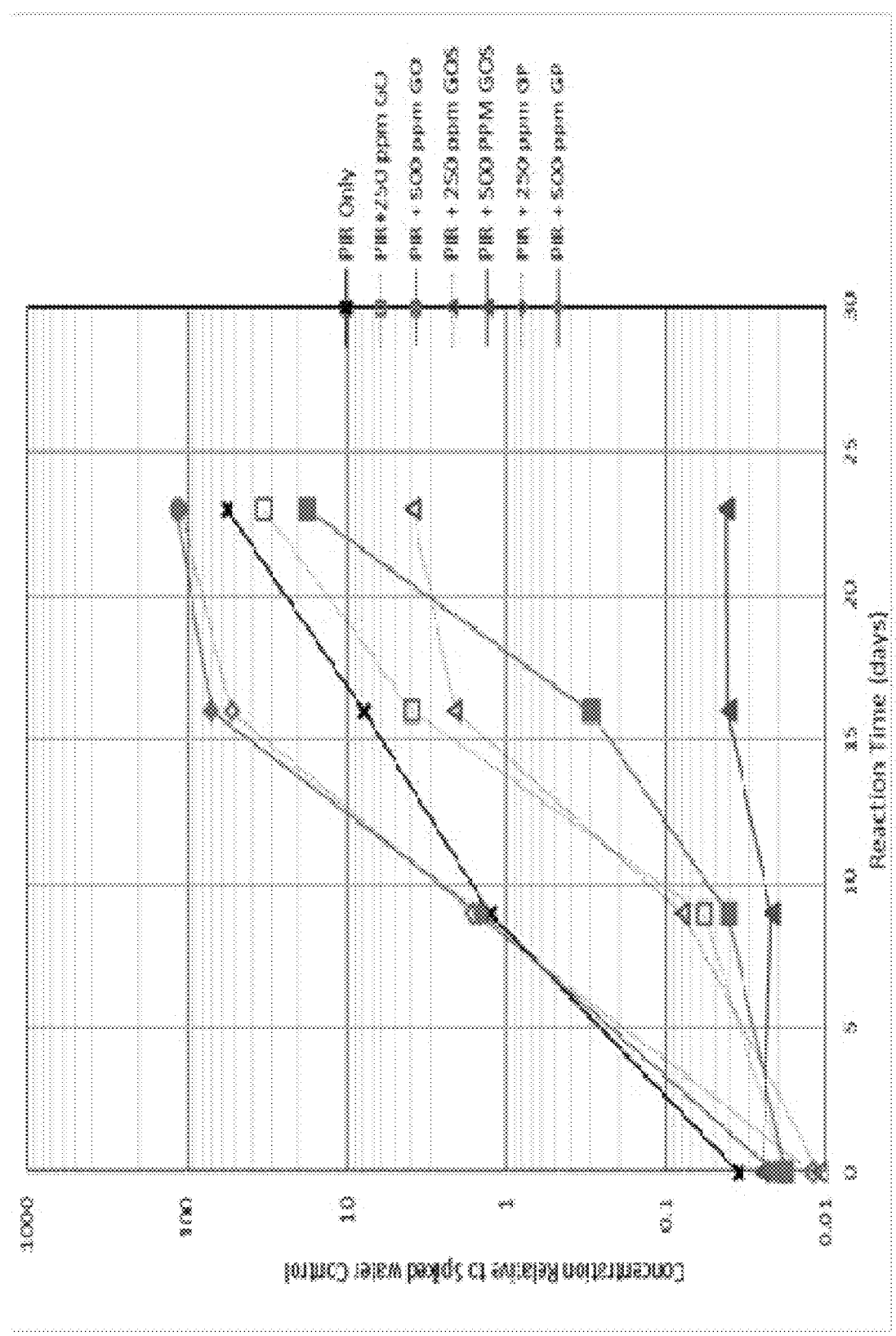
FIG. 19 is a graph of the methane concentrations listed in FIG. 18.

FIG. 18 is a table and FIG. 19 is a graph of the methane concentration in the control and test samples. After 23 days incubation under laboratory conditions, the presence of GOS yielded the best control response in terms of methane production. Natural pressed GO also exhibited the preferred antimethanogenic response, at least through the initial incubation period. The length and magnitude of antimethanogenic responses for both the GO and GOS were concentration dependent with the higher (i.e., 500 ppm) application rates lasting longer than the lower (i.e., 250 ppm) dosage. The amount of methane produced in the presence of dehydrated GP was the same as that in the positive control test system. The absence of antimethanogenic activity with the GP is presumably due to the loss of volatile diallyl sulfides (which are the active ingredients in the GOS) during the production process.

As a termite (or other xylophage) grows and develops, methanogens clearly play an integral role in the reproduction, growth, development and overall activity of the organism. As such, the AMRs (e.g., red yeast rice, statins, essential oils, synthetic compounds) could be utilized to control termites and all other wood-boring and cellulose digesting pests including but not limited to: i) the Emerald Ash Borer, ii) weevils, iii) wood-boring caterpillars (*Lepidoptera*) such as Carpenterworms (*Prionoxystus robinae*), iv) cockroaches and v) wood-boring Bostrichidae beetles (formerly referred to as the family Lyctidae). The socioeconomic cost and destruction caused by such organisms is significant, and a means to control them using safe, natural, sustainable means is of great benefit to society.

The AMRs, described herein, can be applied in a myriad of ways including, but not limited to, feed baits, aerial applications, dustings, coatings, pellets, powders, slurry, bead, preparation, food supplement, stake, and spike. According to one embodiment, the anti-methanogenic compound is incorporated into cellulose based building materials.

The AMRs may be applied at various stages of the targeted organisms (xylophages) life cycle to yield effective treatment under various scenarios. The AMRs could be applied to locations where the pests are known to inhabit or feed. Individual AMRs may be applied or a combination of AMRs may be applied either together or sequentially.

FIG. 20 illustrates an example feed bait process. The process starts in (A) where a bait station 100 is located in the ground 110. A monitoring device 120 is then paced into the ground 110 within the bait station 100. A station cover 130 is then placed on top. The process then flows to (B) where termites discover and occupy the monitoring device 120 in the bait station 100. The paths that the termites follow to get to the monitoring device 120 are illustrated as 150. The process then continues in (C) where the monitoring device 120 is removed and replaced with bait (food source with an AMR) 140. The termites 155 from the monitoring device 120 are then placed on the bait 140 in the bait station 100 as illustrated in (D).

By controlling the activity of methanogens as disclosed, this provides a unique and important means of pest management.

According to one embodiment, the method further includes adding a pheromone or food source to the environment along with the AMR (added together or in any sequential order) to entice the targeted pest (xylophages) to consume the AMR. Any substrate consumed by a xylophage could be utilized including fermentable substrates in liquid, solid, fibrous, and/or emulsified states.

It is understood that the invention is not limited to the disclosed AMRs or specific embodiments and examples, but is intended to cover various modifications and equivalent arrangements included within the spirit and scope of the appended claims.

What is claimed is:

1. A method of xylophage control, the method comprising:
   causing a xylophage to ingest an effective amount of an antimethanogenic reagent (AMR) comprising a synthetic garlic oil, wherein the AMR inhibits methane production of indigenous symbiotic Archaea located in a gut of the xylophage thus altering a life cycle of the xylophage.

2. The method of claim 1, wherein the AMR further comprises a synthetic diallyl disulfide.

3. The method of claim 1, wherein the AMR further comprises a synthetic diallyl trisulfide.

4. The method of claim 1, wherein the AMR further comprises a synthetic ethyl propionate.

5. The method of claim 1, wherein the AMR further comprises at least one of synthetic diallyl disulfide, synthetic diallyl trisulfide, synthetic ethyl propionate, and combinations thereof.

6. The method of claim 1, wherein the AMR further comprises a naturally-occurring statin or derivatives thereof.

7. The method of claim 1, where the AMR further comprises linoleic acid or a related compound.

8. The method of claim 1, where the AMR further comprises an essential oil.

9. The method of claim 1, wherein the AMR further comprises red yeast rice.

10. The method of claim 1, wherein the AMR is incorporated into a pest "bait" that the xylophage ingest.

11. The method of claim 1, wherein the AMR is incorporated into cellulose based building materials that the xylophage ingest.

12. The method of claim 1, wherein the AMR is incorporated into a spray that is provided on a food source that the xylophage ingest.

13. The method of claim 1, wherein the AMR is incorporated into a cellulose-based powder that is provided on a food source that the xylophage ingest.

14. The method of claim 1, further comprising
   applying species and/or behavior specific pheromones on or around a food source to attract the xylophage; and
   applying the AMR on the food source that the xylophage will ingest.

15. The method of claim 14, wherein the AMR and the pheromones are applied concurrently.

16. The method of claim 14, wherein the AMR and the pheromones are applied sequentially.

17. The method of claim 1, wherein the AMR interferes with biosynthesis of psuedomurein by the indigenous symbiotic Archaea.

18. The method of claim 1, wherein the xylophage include termites, Emerald Ash Borers, weevils, wood-boring caterpillars, wood-boring beetles, bark beetles, gribbles, horntails, shipworms, cockroaches, and wood-boring ants.

19. The method of claim 1, wherein the AMR further comprises at least one of synthetic compounds, naturally occurring statins, essential oils and combinations thereof.

* * * * *